United States Patent
Laskaska et al.

(10) Patent No.: US 12,292,102 B1
(45) Date of Patent: May 6, 2025

(54) LOCKING DIFFERENTIALS IN ROTOR SHAFTS

(71) Applicant: GM GLOBAL TECHNOLOGY OPERATIONS LLC, Detroit, MI (US)

(72) Inventors: Matthew James Laskaska, Essexville, MI (US); James M Hart, Belleville, MI (US); Chi Teck Lee, Novi, MI (US); Dumitru Puiu, Sterling Heights, MI (US); Brenten Paul Corliss, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/675,849

(22) Filed: May 28, 2024

(51) Int. Cl.
| | |
|---|---|
| H02K 7/116 | (2006.01) |
| B60K 17/16 | (2006.01) |
| B60K 23/04 | (2006.01) |
| F16H 48/08 | (2006.01) |
| F16H 48/22 | (2006.01) |
| F16H 48/30 | (2012.01) |
| F16H 48/20 | (2012.01) |
| F16H 48/36 | (2012.01) |

(52) U.S. Cl.
CPC ............ *F16H 48/08* (2013.01); *B60K 17/16* (2013.01); *F16H 48/22* (2013.01); *F16H 48/30* (2013.01); *H02K 7/116* (2013.01); *F16H 2048/082* (2013.01); *F16H 2048/204* (2013.01); *F16H 2048/364* (2013.01)

(58) Field of Classification Search
CPC ........ H02K 7/116; B60K 17/16; B60K 23/04; F16H 2048/364; F16H 48/08; F16H 48/22; F16H 48/30; F16H 2048/082; F16H 2048/204
See application file for complete search history.

(56) References Cited

U.S. PATENT DOCUMENTS

| | | | |
|---|---|---|---|
| 10,982,723 B1* | 4/2021 | Chacko | F16D 23/12 |
| 2006/0046887 A1* | 3/2006 | Bennett | H02K 7/108 |
| | | | 475/150 |
| 2014/0283648 A1* | 9/2014 | Severinsson | B60K 1/00 |
| | | | 74/665 F |
| 2018/0112755 A1* | 4/2018 | Littlefield | B60K 1/00 |
| 2020/0141476 A1* | 5/2020 | Zink | F16D 13/52 |
| 2022/0032762 A1* | 2/2022 | Simon | F16H 57/023 |
| 2023/0133502 A1* | 5/2023 | Freiholtz | B60K 17/02 |
| | | | 475/150 |

FOREIGN PATENT DOCUMENTS

WO WO-2024008719 A1 * 1/2024 ............... B60K 1/00

* cited by examiner

*Primary Examiner* — Tisha D Lewis

(74) *Attorney, Agent, or Firm* — Lorenz & Kopf LLP

(57) ABSTRACT

Locking differential systems, vehicles and methods are provided. An electric vehicle includes an electric motor including a stator and a rotor, wherein the rotor is configured to rotate about a rotor axis; a rotor shaft connected to the rotor for rotation about the rotor axis; a differential located within the rotor shaft; a first input shaft connected to first side of the differential; a second input shaft connected to second side of the differential; a locking system configured to selectively lock rotation of the first input shaft to rotation of the rotor shaft; a control system configured to determine when to lock rotation of the first input shaft to rotation of the rotor shaft; and an actuation system configured to operate the locking system to lock rotation of the first input shaft to rotation of the rotor shaft.

14 Claims, 13 Drawing Sheets

LOCKING DIFFERENTIALS IN ROTOR SHAFTS

INTRODUCTION

The present disclosure relates to electric vehicles having rotor shafts including integrated differentials, and more particularly relates to systems for locking such differentials.

Passenger vehicles include a powertrain that is comprised of a drive unit such as an electric motor, a transmission system, and a differential. The transmission system may increase the overall operating range of the vehicle by permitting the drive unit to operate through its torque range.

Typically, the differential is located downstream of the transmission system. Thus, the differential may divide torque between two output shafts that are rotating at typical wheel speeds.

If the differential is located at an upstream location, i.e., up the gear train from the wheel output, the differential may divide torque between two shafts that are rotating at typical engine speeds. Rotation of the shafts at engine speeds presents issues for differential locking that are not encountered at wheel speeds.

Accordingly, it is desirable to provide differential locking systems for vehicles and methods for locking differentials that are capable of performing at engine rotation speeds. Additionally, other desirable features and characteristics of the present disclosure will become apparent from the subsequent description taken in conjunction with the accompanying drawings and the foregoing introduction.

SUMMARY

In an embodiment, an electric vehicle includes an electric motor including a stator and a rotor, wherein the rotor in configured to rotate about a rotor axis; a rotor shaft connected to the rotor for rotation about the rotor axis; a differential located within the rotor shaft; a first input shaft connected to first side of the differential; a second input shaft connected to second side of the differential; a locking system configured to selectively lock rotation of the first input shaft to rotation of the rotor shaft; a control system configured to determine when to lock rotation of the first input shaft to rotation of the rotor shaft; and an actuation system configured to operate the locking system to lock rotation of the first input shaft to rotation of the rotor shaft.

In certain embodiments, the vehicle further includes a passive return device configured to disconnect rotation of the first input shaft from rotation of the rotor shaft.

In certain embodiments of the vehicle, the locking system includes a clutch device located within the rotor shaft.

In certain embodiments of the vehicle, the locking system includes a clutch device; and a ball ramp device configured to selectively close and selectively open the clutch device.

In certain embodiments of the vehicle, the locking system includes a clutch device having a first plate mechanically coupled to the rotor shaft and a second plate mechanically coupled to the first input shaft, wherein the first plate and the second plate are pressed together when the clutch device is closed.

In certain embodiments of the vehicle, the actuation system includes an actuator gear selectively driven by an actuator shaft; and a ball ramp operatively connected to the actuator gear, wherein the ball ramp is configured to translate a rotary motion from the actuator gear to a lateral motion by expanding.

In certain embodiments of the vehicle, the locking system includes a clutch device, and wherein the actuation system includes an actuator gear; a ball ramp operatively connected to the actuator gear, wherein the ball ramp is configured to translate a rotary motion from the actuator gear to a lateral motion; and a thrust bearing configured to allow transmission of a lateral force from the ball ramp to the clutch device without transmitting a rotational force therebetween.

In certain embodiments of the vehicle, the locking system includes a clutch device having a first plate mechanically coupled to a side gear of the differential and having a second plate mechanically coupled to the rotor shaft, wherein the side gear is coupled to the first input shaft, and wherein the first plate and second plate are pressed together when the clutch device is closed.

In certain embodiments of the vehicle, the differential includes a differential side gear connected to the first input shaft; the locking system includes a clutch device having a first plate mechanically coupled to the differential side gear and having a second plate mechanically coupled to the rotor shaft; and the first plate and second plate are pressed together to lock rotation of the first input shaft to rotation of the rotor shaft.

In certain embodiments, the vehicle further includes a rotor shaft clutch hub mounted on the rotor shaft; and an input shaft clutch hub mounted on the first input shaft; wherein the locking system includes a clutch device having a first plate mechanically coupled to the rotor shaft clutch hub and having a second plate mechanically coupled to the input shaft clutch hub; and the first plate and second plate are pressed together to lock rotation of the first input shaft to rotation of the rotor shaft.

In another embodiment, a locking differential system for a motor vehicle includes a rotor shaft operatively connected to an electric motor, wherein the rotor shaft is configured to rotate about a rotor axis; differential gears housed within the rotor shaft and configured to rotate about the rotor axis; a first input shaft operatively connected to the differential gears and rotatable about the rotor axis, wherein the first input shaft is configured to transmit power from the rotor shaft to a first output; a second input shaft operatively connected to the differential gears and rotatable about the rotor axis, wherein the second input shaft is configured to transmit power from the rotor shaft to a second output; and a lock configured to selectively lock the first input shaft to the rotor shaft.

In certain embodiments of the locking differential system, the lock includes a clutch device and a ball ramp device configured to selectively close and selectively open the clutch device.

In certain embodiments of the locking differential system, the lock includes a clutch device having a first plate mechanically coupled to the rotor shaft and a second plate mechanically coupled to the first input shaft, wherein the first plate and the second plate are pressed together when the clutch device is closed.

In certain embodiments of the locking differential system, the lock further includes an actuator configured to selectively press the first plate and the second plate together, wherein the actuator includes: an actuator gear selectively driven by an actuator shaft; and a ball ramp having a periphery operatively connected to the actuator gear, wherein the ball ramp is configured to translate a rotary motion from the actuator gear to a lateral motion by expanding to press the first plate and the second plate together.

In certain embodiments of the locking differential system, the actuator further includes a return device configured to cause the ball ramp to contract to disconnect the first plate and the second plate.

In certain embodiments of the locking differential system, the lock includes a clutch device having a first plate mechanically coupled to a side gear of the differential gears and having a second plate mechanically coupled to the rotor shaft, wherein the side gear is coupled to the first input shaft, and wherein the first plate and second plate are pressed together when the clutch device is closed.

In certain embodiments of the locking differential system, the lock includes a clutch device located inside the rotor shaft.

In another embodiment, a method for automatically locking a differential housed inside a rotor shaft and connected to an input shaft is provided. The method includes interconnecting a clutch device between the rotor shaft and the input shaft, wherein the clutch device is configured to lock rotation of the input shaft with rotation of the rotor shaft when closed and is configured to disconnect rotation of the input shaft from rotation of the rotor shaft when open; activating an actuator motor to rotate an actuator gear; converting rotary motion of the actuator gear to linear motion of a plate; and applying a linear force from the plate to the clutch device to close the clutch device and lock rotation of the input shaft with rotation of the rotor shaft.

In certain embodiments, the method further includes determining with a control system that locking the differential is desired; and communicating an activation signal from the control system to the actuator motor to activate the actuator motor.

In certain embodiments, the method further includes determining with the control system that locking the differential is no longer desired; communicating a de-activation signal from the control system to the actuator motor to de-activate the actuator motor; de-activating the actuator motor; and applying a passive force from a return device to open the clutch device and disconnect rotation of the input shaft from rotation of the rotor shaft.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, summary or the following detailed description. As used herein, the term module refers to any hardware, software, firmware, electronic control unit or component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of automated driving systems including cruise control systems, automated driver assistance systems and autonomous driving systems, and that the vehicle system described herein is merely one example embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
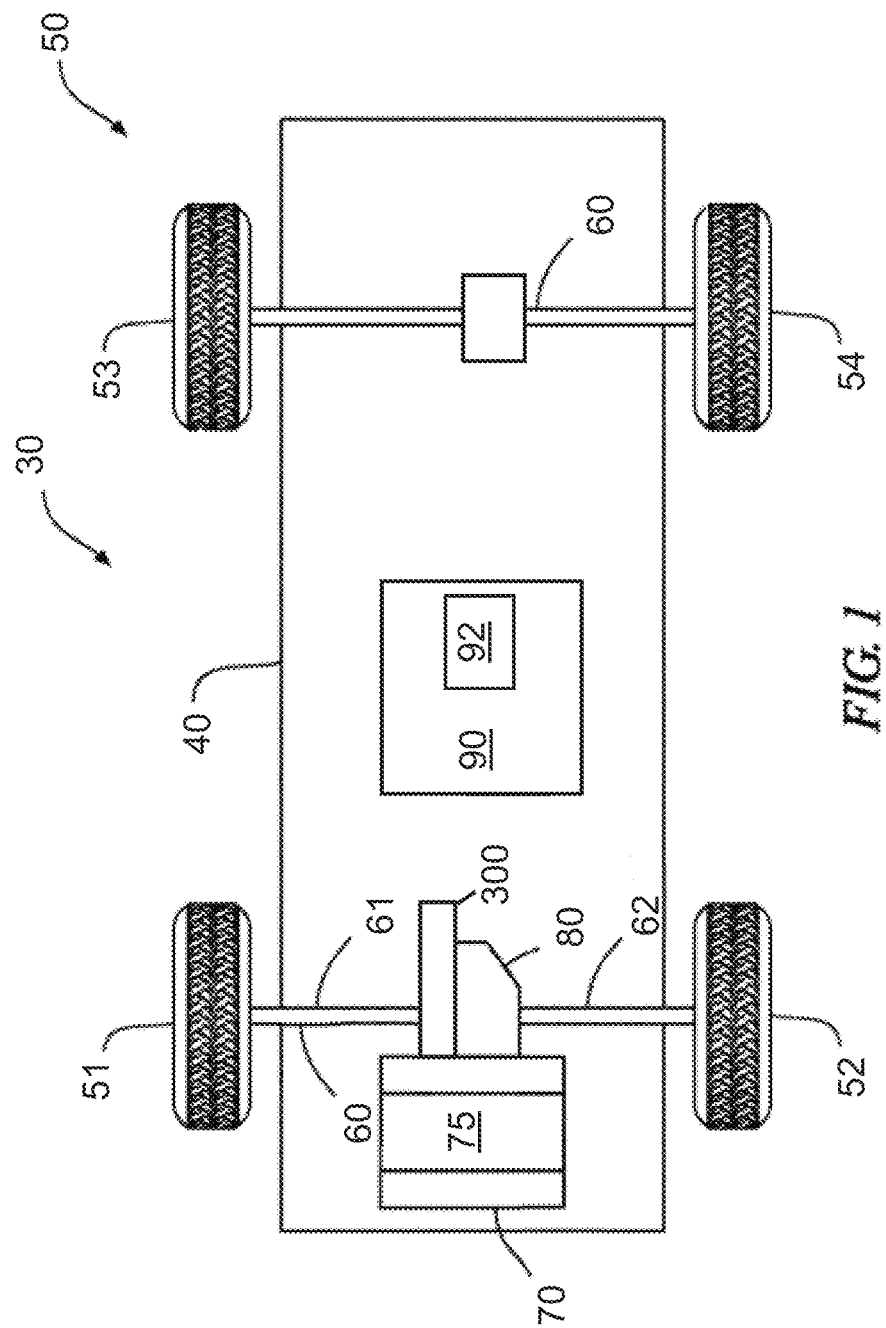
FIG. 1 is a functional block diagram of a vehicle including a differential locking system, in accordance with exemplary embodiments.

Referring to FIG. 1, a vehicle 30 is illustrated in functional block diagram form. In various embodiments, the vehicle 30 is an automobile. The vehicle 30 may be any one of a number of different types of automobiles, such as, for example, a sedan, a wagon, a van, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 30 may also include another type of mobile platform.

As depicted in FIG. 1, the vehicle 30 includes a body 40 that is arranged on or integrated with a chassis. The body 40 substantially encloses other components of the vehicle 30. The vehicle 30 also includes a plurality of wheels 50. The wheels 50 are each rotationally coupled to the chassis near a respective corner of the body 40 to facilitate movement of the vehicle 30. In one embodiment, the vehicle 30 includes four wheels 50, including front wheels 51 and 52 and rear wheels 53 and 54, although this may vary in other embodiments (for example for trucks and certain other vehicles).

In certain embodiments, selected wheels 50 may be driven by axles 60. For example, wheel 51 may be driven by axle 61 and wheel 52 may be driven by axle 62.

Vehicle 30 further includes a propulsion system 70 for powering the wheels 50. The propulsion system 70 includes a powerplant 75, such as an electric motor/generator. Additionally or alternatively, the propulsion system 70 may include an internal combustion engine. As shown, vehicle 30 also includes a transmission system 80. The vehicle 30 is further provided with a locking system 300 as described below.

As shown, vehicle 30 may include a control system 90. In the embodiment depicted in FIG. 1, the control system 90 is coupled with various systems of the vehicle 30, including the propulsion system 70, the transmission 80, and locking system 300. In various embodiments, the control system 90 may also be coupled to one or more other systems and/or components of the vehicle 30 and includes a controller 92. The controller 92 may be configured as any number of controllers and/or microcontrollers in communication with each other.

The controller 92 may be coupled with various devices and systems of the vehicle 30, such as the propulsion system 70, transmission 80, and locking system 300. The controller 92 may accept information from various sources, process that information, and provide control commands based thereon to effect outcomes such as operation of the vehicle 30 and its systems, including of the propulsion system 70, transmission 80, and locking system 300. In the depicted embodiment, the controller 92 includes a processor including a memory device and storage device. The processor performs the computation and control functions of the controller 92, and may be any type of processor or multiple processors, single integrated circuits such as a microprocessor, or any suitable number of integrated circuit devices and/or circuit boards working in cooperation to accomplish the functions of a processing unit. During operation, the processor may execute one or more programs and may use data, each of which may be stored within the processor, the processor controls the general operation of the controller 92 in executing the processes described herein, such as the processes and methods described in greater detail below.

The controller 92 is coupled with various actuators including an actuator of the locking system 300. The controller 92 is also coupled with various sensors that sense observable conditions of the vehicle 30.

In various embodiments, the controller 92 is coupled to, among other devices, the sensors, the propulsion system 70, transmission 80, locking system 300, and/or one or more other systems, devices, and/or components of the vehicle 30.

Figure 2:
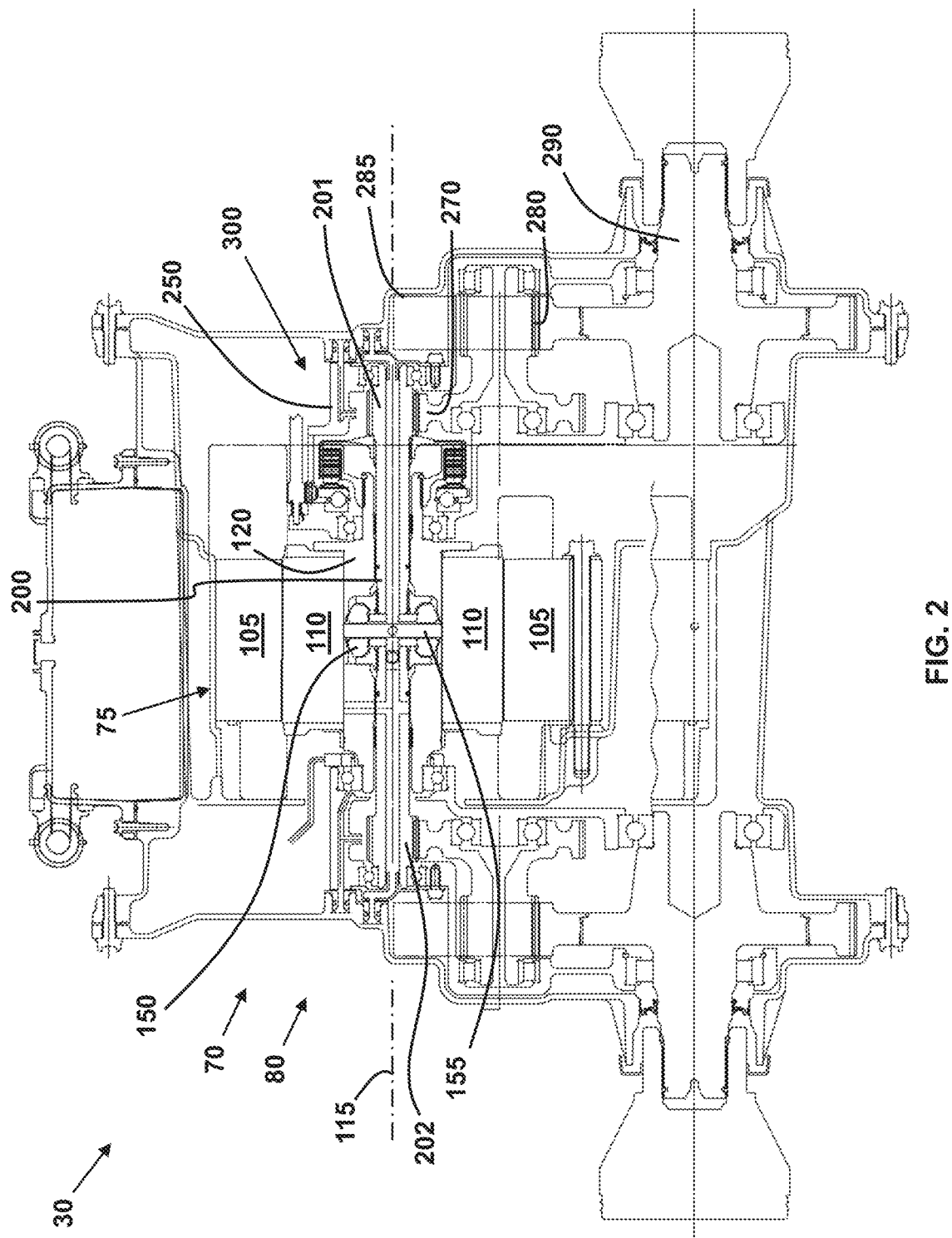
FIG. 2 is a cross-sectional schematic view of components of the drive train of the vehicle of FIG. 1, taken through the rotor axis, in accordance with exemplary embodiments.

FIG. 2 illustrates the torque path from powerplant 75 of the propulsion system 70, through the transmission 80, and to output shafts for powering wheels 51 and 52. As shown, the transmission system 80 is configured to transmit power received from powerplant 75.

The illustrated powerplant 75 is an electric motor and includes a stator 105 and a rotor 110. The rotor 110 include or is fixed to a rotor shaft 120. The rotor 110 and rotor shaft 120 are configured to rotate about rotor axis 115.

As shown, in vehicle 30, a differential gear set 150, or differential 150, is located inside the rotor 110 and/or rotor shaft 120, such that the rotor 110 and/or rotor shaft 120 serves as the differential housing. The differential 150 is fixed to the rotor 110 by a pin 155. Thus, the pin 155 rotates above the rotor axis 115. The differential 150 include first differential gears 151, identified in later Figures, that may rotate about the axis of the pin 155. The differential 150 further includes differential side gears 152, identified in later Figures, that engage the first differential gears 151 and that rotate about the rotor axis 115.

Input shafts 200, including a first input shaft 201 and a second input shaft 202, are received within the rotor shaft 120 and extend outward from the rotor 110. Each input shaft 201 and 202 is operatively connected to the differential 150 such that rotation of the rotor 110 is transmitted to the input shafts 201 and 202. Specifically, each input shaft 201 and 202 is splined direction to the differential side gears 152. The differential 150 is an open differential configured to split the motor torque in two between the first input shaft 201 and the second input shaft 202.

Each input shaft 200 extends from the differential 150 to a distal end that engages a transfer gear 270. The transfer gear 270 may be further operatively connected to gears 280 and 285 that drive a respective output shaft 290. Each output shaft 290 is configured to drive a respective axle 60 of the vehicle.

As indicated in FIG. 2, the vehicle 30 is provided with a locking system 300 to lock the first input shaft 201 to the rotor shaft 120, such as in conditions where one of the wheels 50 has little or no traction.

Various components are mounted to or located within a carrier 250 as shown.

Figure 3:
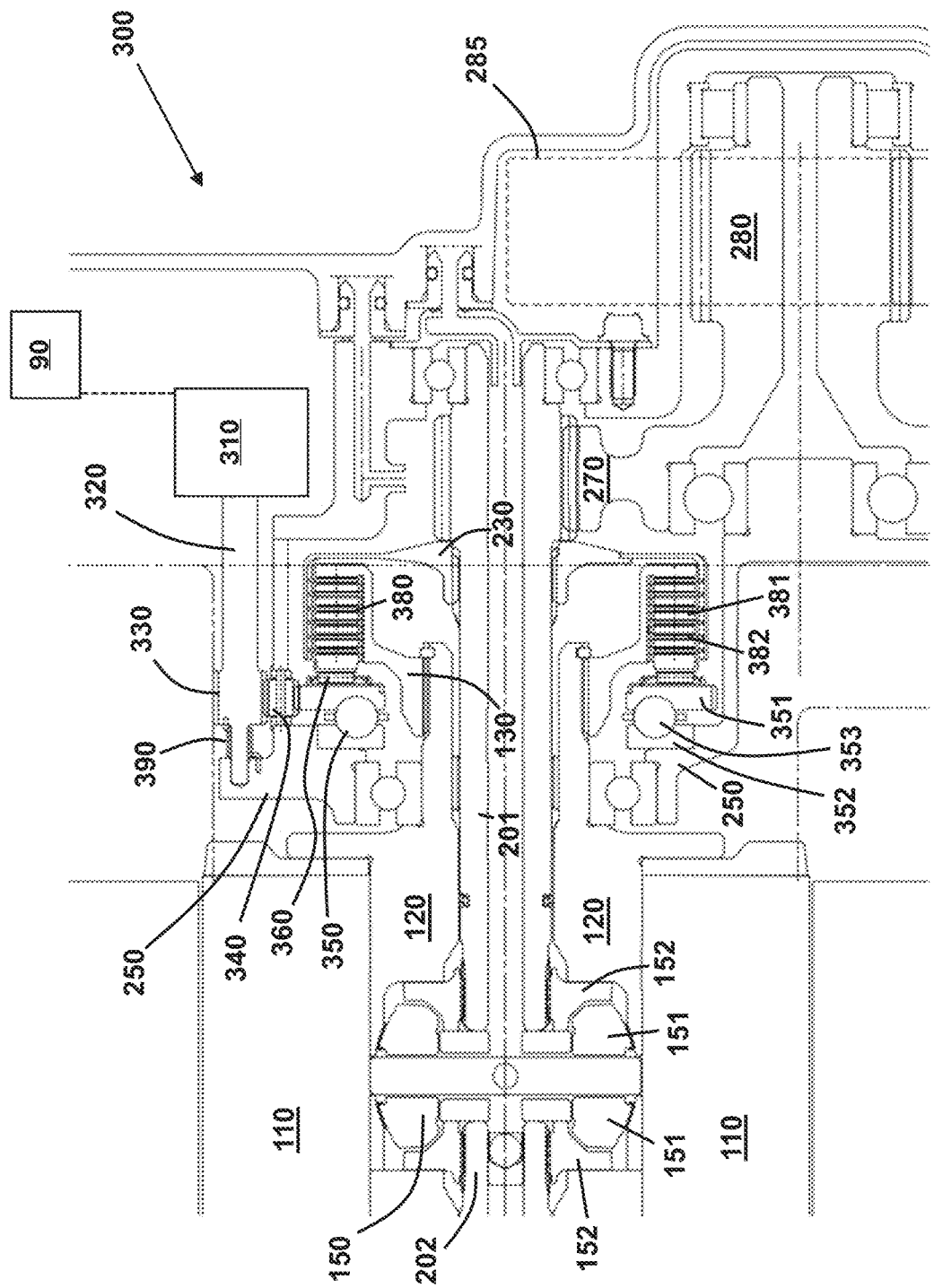
FIG. 3 is a focused portion of the cross-sectional schematic view of FIG. 2.

Cross-referencing FIG. 2 with FIG. 3, the locking system 300 is described. The locking system 300 includes an actuator motor 310 that is configured to rotate an actuator shaft 320 about an actuator axis 322 in a first rotation direction. As shown, a distal end of the actuator shaft 320 may be mounted to the carrier 250. In certain embodiments, the actuator axis 322 is parallel to the rotor axis 115.

As shown, an actuator gear 330 is formed on the actuator shaft 320. The locking system 300 further includes an idler gear 340 that engages the actuator gear 330. As shown, the idler gear 340 is rotatably mounted to the carrier 250 and may rotate about an axis parallel to the actuator shaft 320. The idler gear 340 further engages a device 350 for converting rotary motion to linear motion. In certain embodiments, device 350 is a ball ramp mechanism 350. The illustrated ball ramp mechanism 350 includes a first plate 351 that engages the idler gear 340. The ball ramp mechanism 350 further includes a second plate 352. The plates 351 and 352 are interconnected by a ball or balls 353 that ride in ramped slots formed in one or both of the plates 351 and 352. Thus, when the plate 351 is rotated by the idler gear 340, the plates 351 and 352 are forced away from one another. Plate 352 is fixed to the carrier 250 and is stationary, so the force causes plate 351 to move away from plate 352.

As shown, a thrust bearing 360 is located adjacent to the plate 351 of the ball ramp mechanism 350, between plate 351 and a clutch pack 380 or plate clutch mechanism 380. In certain embodiments, the thrust bearing 360 has a first side rotatably connected to a second side. The first side of the thrust bearing 360 may be connected to the plate 351 of the ball ramp mechanism 350 and the second side of the thrust bearing 360 may be connected to the clutch pack 380.

The clutch pack 380 includes a plurality of first friction plates 381 and a plurality of second friction plates 382. The first friction plates 381 and second friction plates 382 are interleaved such that a first friction plate 351 is located between each pair of adjacent second friction plates 382 and a second friction plate 352 is located between each pair of adjacent first friction plates 381. When the clutch pack 380 is in an open configuration, the first friction plates 381 and second friction plates 382 are distanced from one another, are disengaged, and are free to rotate about rotor axis 115 relative to one another.

The locking system 300 may further include a return device 390 for resisting rotation of the actuator shaft 320 and for returning the actuator shaft 320 to an initial configuration. For example, the return device 390 may be a return spring that biases the actuator shaft 320 in a second rotational direction opposite to the first rotational direction in which the actuator shaft 320 may be rotated by the actuator motor 310.

As shown in FIG. 3, a rotor shaft clutch hub 130 is engaged with the rotor shaft 120 for rotation about the rotor axis 115. Specifically, the rotor shaft clutch hub 130 may be splined to the rotor shaft 120 as shown. Thus, rotation of the rotor shaft 120 drives rotation of the rotor shaft clutch hub 130.

As shown in FIG. 3, an input shaft clutch hub 230 is engaged with the first input shaft 201 for rotation about the rotor axis 115. Specifically, the input shaft clutch hub 230 may be splined to the first input shaft 201 as shown. Thus, rotation of the first input shaft 201 may drive rotation of the input shaft clutch hub 230.

The first friction plates 381 are engaged to the rotor shaft clutch hub 130. For example, the first friction plates 381 may be splined to the rotor shaft clutch hub 130. Thus, rotation of the rotor shaft clutch hub 130 drive rotation of the first friction plates 381.

The second friction plates 382 are engaged to the input shaft clutch hub 230. For example, the second friction plates 382 may be splined to the input shaft clutch hub 230. Thus, rotation of the input shaft clutch hub 230 may drive rotation of the second friction plates 382.

The clutch pack 380 is operable to selectively connect the first input shaft 201 to the rotor shaft 120. Specifically, the clutch pack 380 is operable to selectively connect the input shaft clutch hub 230 to the rotor shaft clutch hub 130. For example, the second friction plates 382 may be driven in the linear direction away from the ball ramp mechanism 350 and into contact with the first friction plates 381. Linear movement of the second friction plates 382 is allowed by their splined connection to the input shaft clutch hub 230. Alternatively or additionally, the input shaft clutch hub 230 may move in the linear direction as the splined connection between the input shaft clutch hub 230 and the first input shaft 201 may allow for a small amount of linear movement of the input shaft clutch hub 230 relative to the first input shaft 201. When the friction plates 381 and 382 are contacted and pressed into one another, relative rotation between the friction plates 381 and 382 is prevented. In other words, the friction plates 381 and 382 are locked into rotating together at a same speed.

As a result, the rotor shaft clutch hub 130 and the input shaft clutch hub 230 are locked into rotating together at a same speed. Thus, the rotor shaft 120 and the first input shaft 201 are locked into rotating together at a same speed.

As noted above, the first input shaft 201 and the second input shaft 202 (a portion of which is shown in FIG. 3) are operatively connected to the rotor 110 via the differential 150. For example, first differential gears 151 may drive rotation of second differential gears 152, and second differential gears 152 (or differential side gears 152) may drive rotation of the input shafts 201 and 202.

Due to the interconnection through the differential 150, when the rotor shaft 120 and the first input shaft 201 are locked into rotating together at a same speed, the second input shaft 202 is also locked into rotating at the same speed.

As shown, the actuator motor 310 may be in communication with the control system 90. Thus, when the control system 90 determines that the differential 150 should be locked, such as to avoid a loss of torque when one wheel loses friction, the control system 90 may automatically lock the first input shaft 201 to the rotor shaft 120 through the locking system 300.

Specifically, when the control system 90 determines that the differential 150 should be locked, the control system 90 activates the actuator motor 310. When activated, the actuator motor 310 rotates the actuator shaft 320 in the first direction. As a result, the actuator gear 330 rotates in the first direction and causes the idler gear 340 to rotate. Rotation of the idler gear 340 causes rotation of the first plate 351 of the ball ramp device 350. Rotation of the first plate 351 causes linear movement of the first plate 351 away from the second plate 352, i.e., away from the rotor 110.

The thrust bearing 360 transmits the linear load from the first plate 351 of the ball ramp device 350 to the clutch pack 380 without impeding the rotation of the clutch pack 380 about the rotor axis 115. It is noted that the components of the locking system 300 upstream of the thrust bearing 360, i.e., the actuator motor 310, shaft 320, gear 330, idler gear 340, and ball ramp device 350 do not rotate above the rotor axis 115.

When the linear force from the ball ramp device 350 through the thrust bearing 360 is applied to the clutch pack 380, the second friction plates 382 are driven in the linear direction away from the ball ramp mechanism 350 and into contact with the first friction plates 381.

As a result, the first input shaft 201 is locked in rotation with the rotor shaft 120 at a same rotational speed, and the second input shaft 202 is locked in rotation with the first input shaft 201 at the same rotational speed, as described above.

When the control system 90 determines that the differential 150 should be unlocked, the control system 90 may automatically unlock the first input shaft 201 from the rotor shaft 120.

Specifically, when the control system 90 determines that the differential 150 should be unlocked so that the first input shaft 201 and second input shaft 202 may rotate independently of one another, the control system 90 de-activates the actuator motor 310. When de-activated, the actuator motor 310 ceases application of the rotation force from the actuator motor 310 onto the actuator shaft 320 in the first direction. The force from the return device 390 to compel rotation of the actuator shaft 320 in the second direction then causes rotation of the actuator shaft 320 in the second direction. It is noted that the return device 390 is unpowered, so that the unpowered state of the locking system 300 is the unlocked configuration. Specifically, if the actuator motor 310 loses power, the return device 390 will rotate the actuator shaft 320 in the second direction and ensure that the locking system 300 is in the unlocked configuration.

Rotation of the actuator shaft 320 and actuator gear 330 in the second direction due to the force from the return device 390 causes the idler gear 340 to rotate back to its initial position. Likewise, rotation of the idler gear 340 causes the first plate 351 to rotate back to its initial position. As the first plate 351 returns to its initial position, the ball ramp device contracts. Specifically, the first plate 351 moves linearly back toward the second plate 352. As a result, the thrust bearing 360 and the second friction plates 382 are moved in the same linear direction. As a result, the second friction plates 382 disengage from the first friction plates 381. As a result, the clutch pack 380 is open and does not transmit rotational force.

When the clutch pack 380 is open, rotation of the first input shaft 201 is driven only by the differential 150. In other words, the first input shaft 201 is no longer directly connected to the rotor shaft 120.

Figure 4:
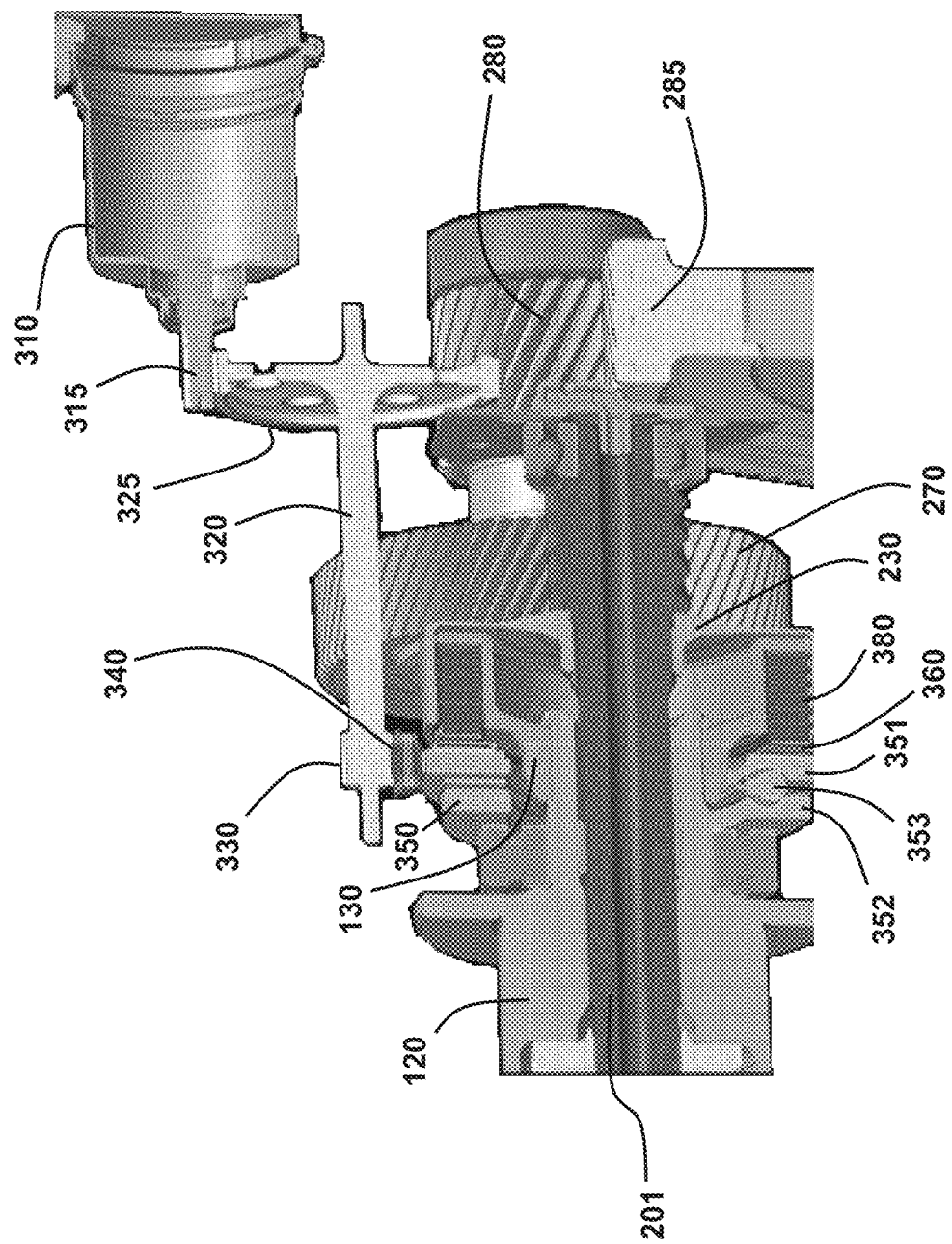
FIG. 4 is a perspective view taken along the rotor axis of the embodiment of FIG. 2, with certain components removed for clarity.
Figure 5:
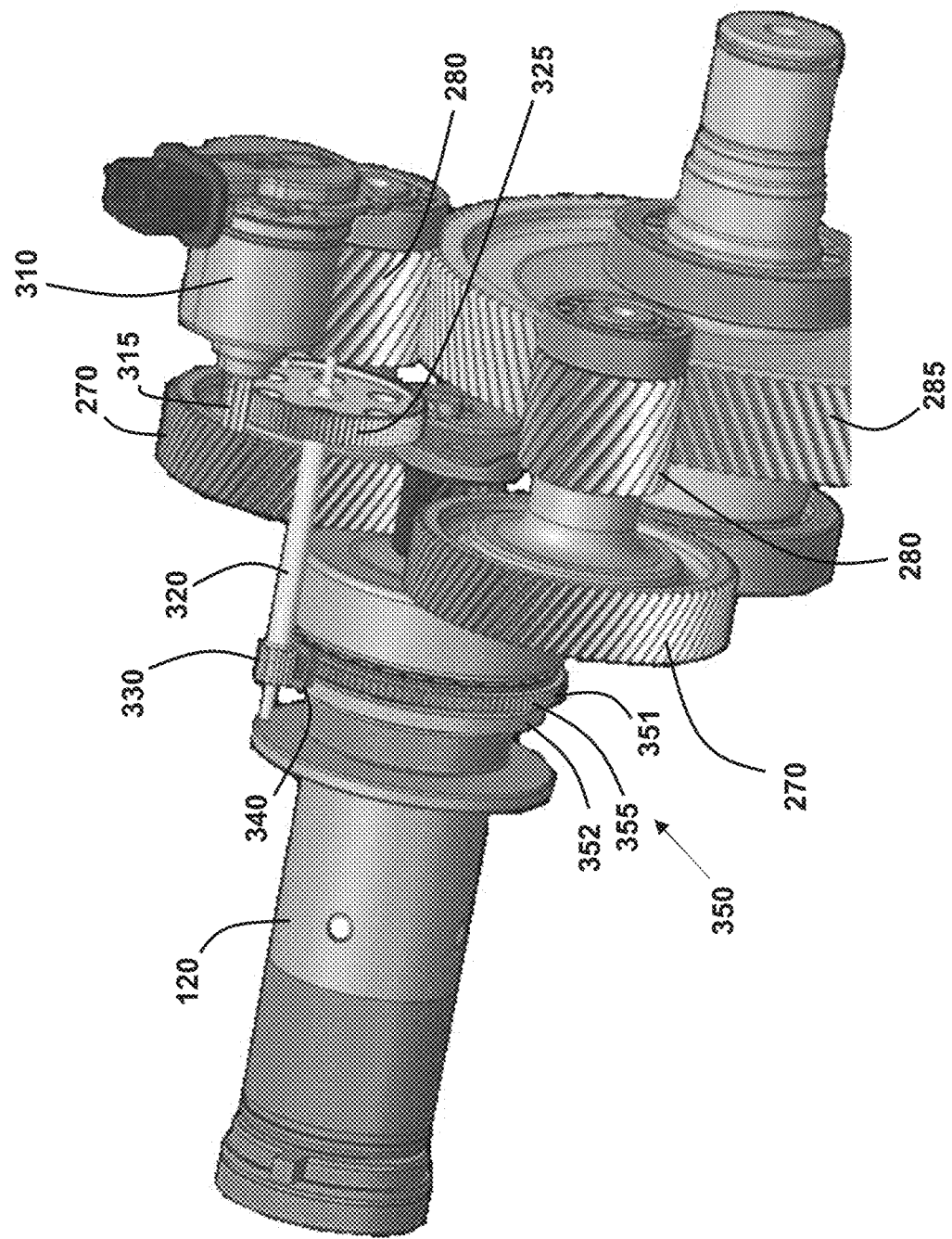
FIG. 5 is a perspective view of the embodiment of FIG. 2, with certain components removed for clarity.
Figure 6:
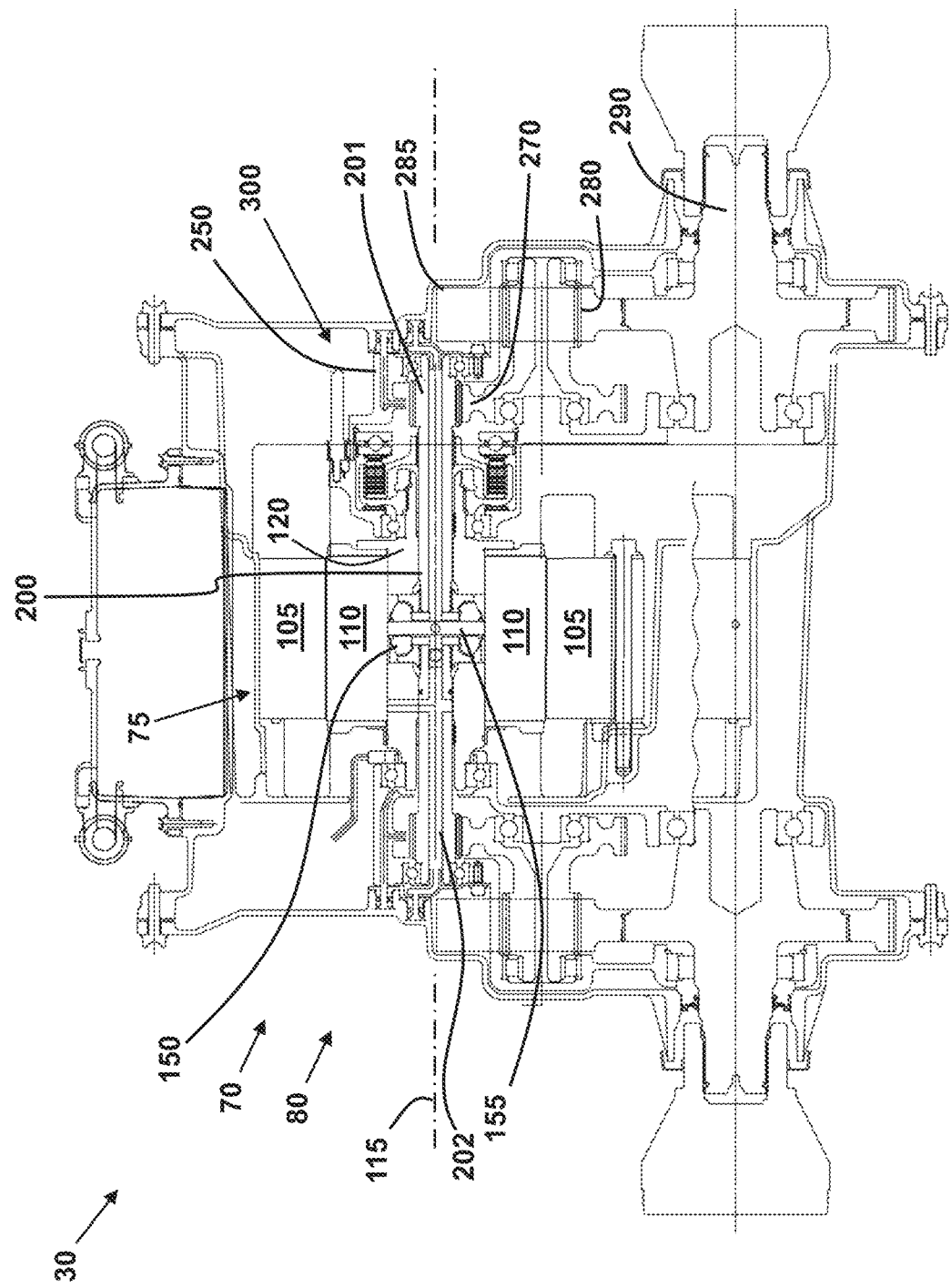
FIG. 6 is a cross-sectional schematic view of components of the drive train of the vehicle of FIG. 1, taken through the rotor axis, in accordance with exemplary embodiments.
Figure 7:
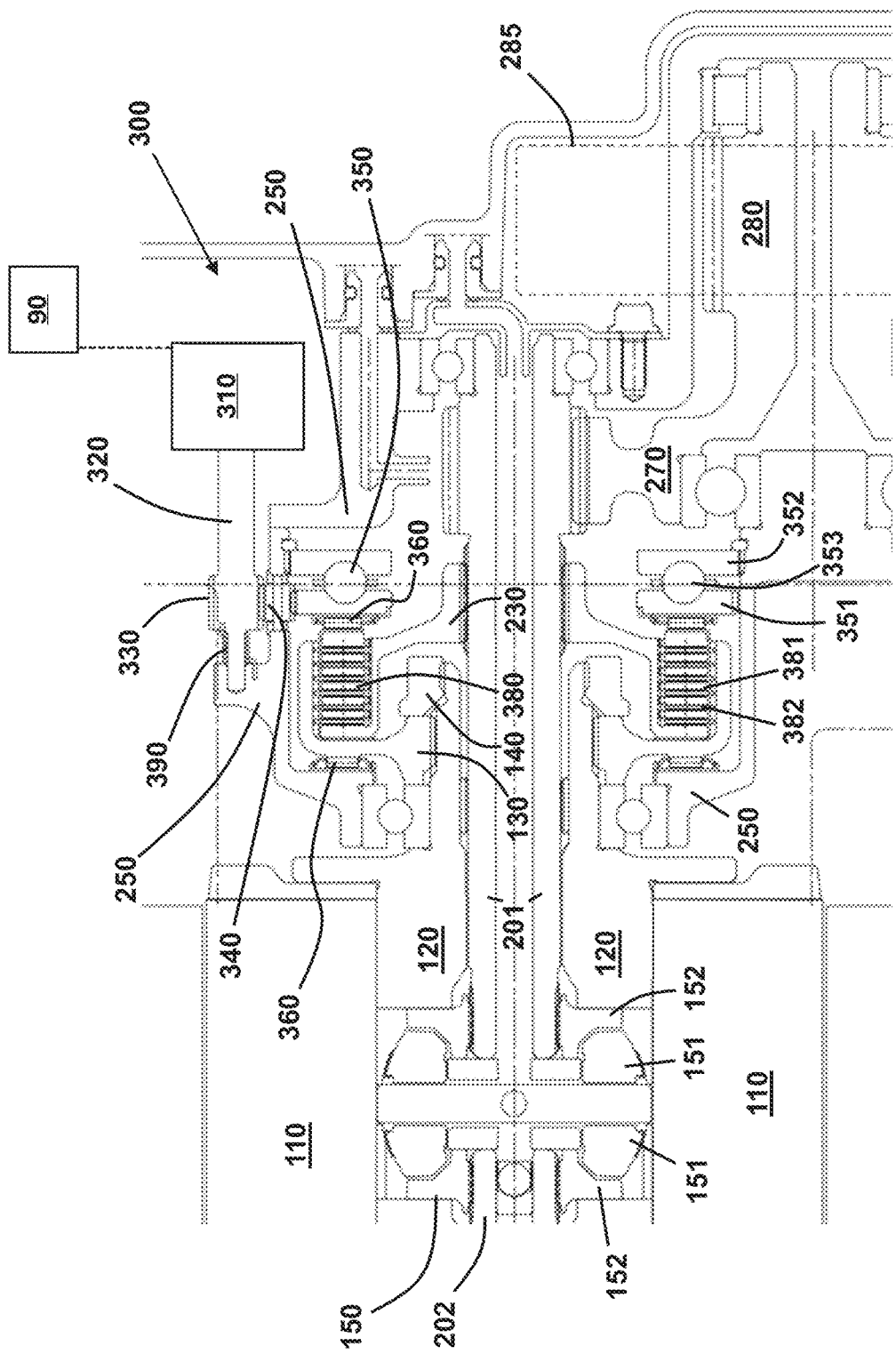
FIG. 7 is a focused portion of the cross-sectional schematic view of FIG. 6.
Figure 8:
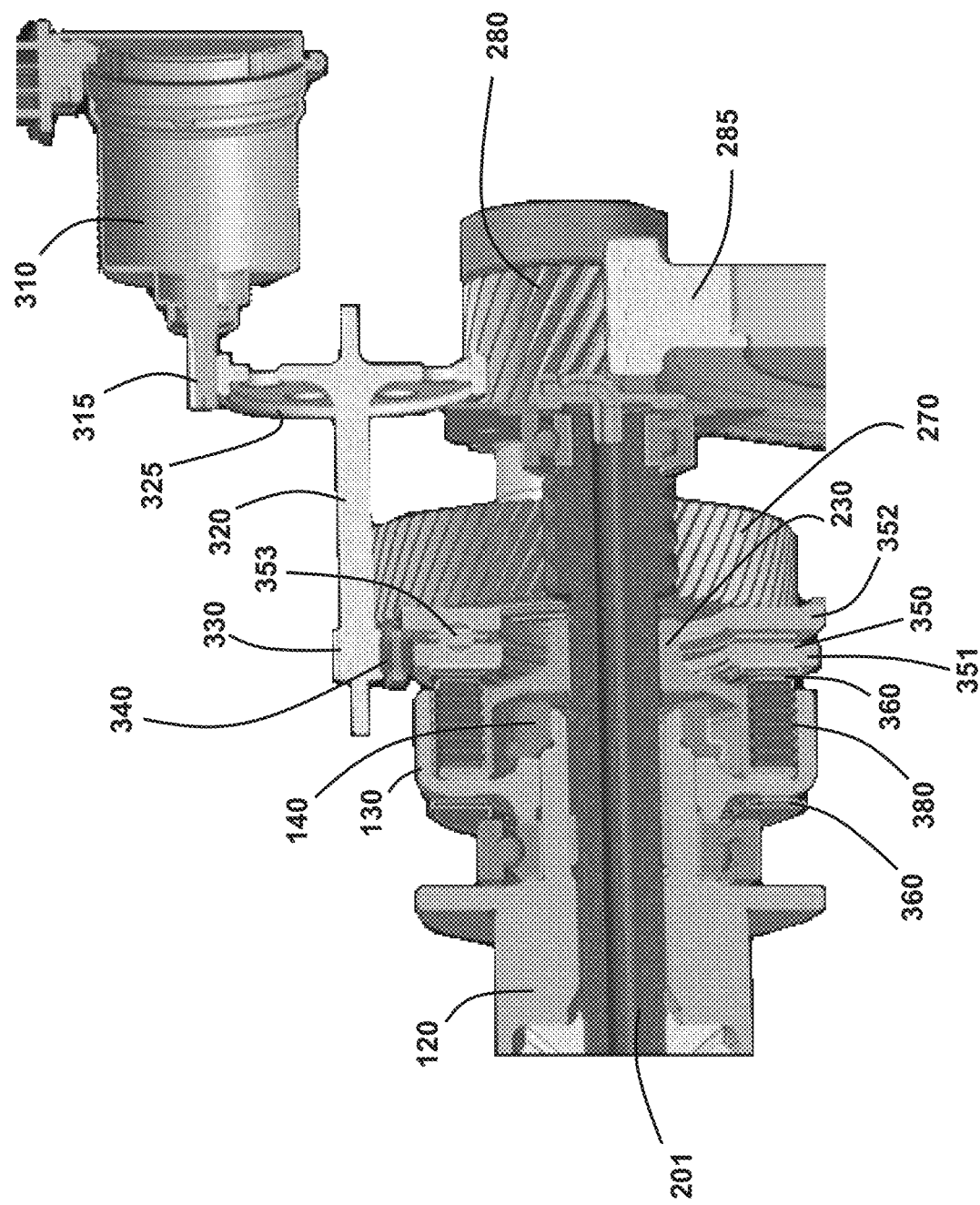
FIG. 8 is a perspective view taken along the rotor axis of the embodiment of FIG. 6, with certain components removed for clarity.
Figure 9:
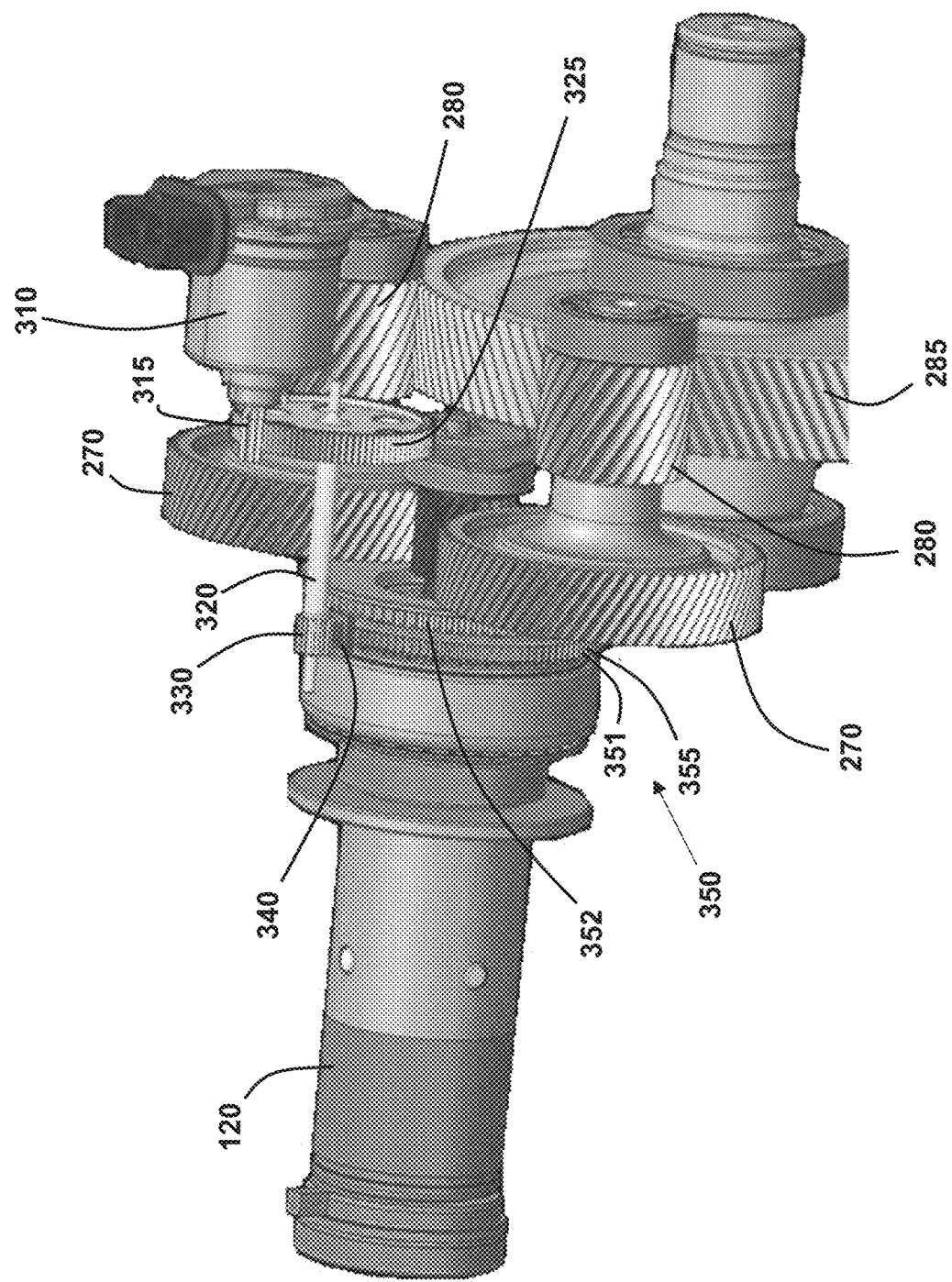
FIG. 9 is a perspective view of the embodiment of FIG. 6, with certain components removed for clarity.
Figure 10:
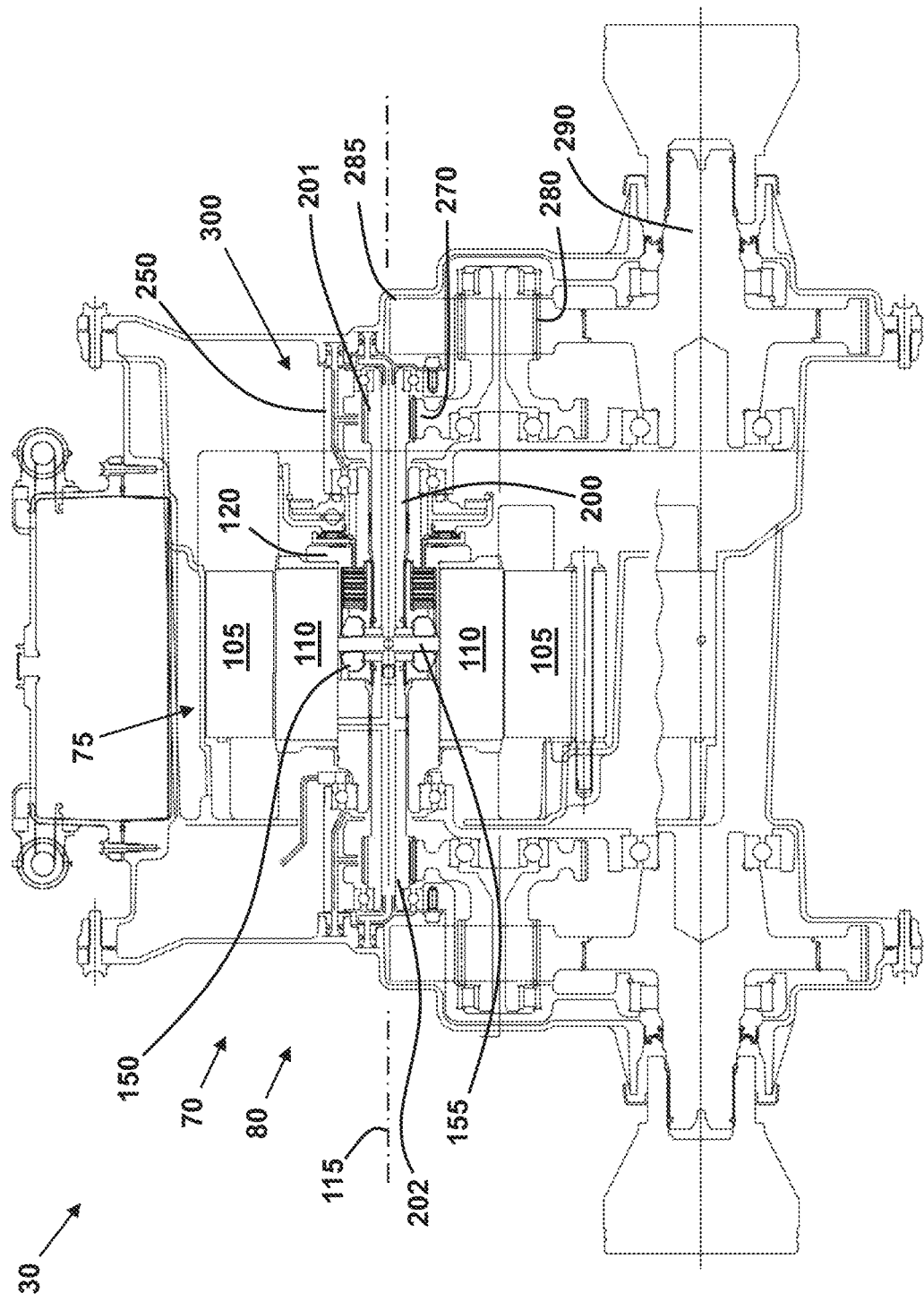
FIG. 10 is a cross-sectional schematic view of components of the drive train of the vehicle of FIG. 1, taken through the rotor axis, in accordance with exemplary embodiments.

FIG. 4 is a perspective view taken along a plane cut through the first input shaft 201 and having certain components removed for clarity of other components. FIG. 5 is a further perspective view with certain components removed for clarity of other components. Cross-referencing FIGS. 4 and 5, the actuator motor 310 may include a geared shaft 315, and the actuator shaft 320 may be formed with a large gear 325 that engages the geared shaft 315. The actuator motor 310 and geared shaft 315 may rotate about a motor axis 312. Motor axis 312 may be parallel to the rotor axis 115. The actuator shaft 320 extends to the actuator gear 330 that engages the idler gear 340. The idler gear 340 engages a toothed outer perimeter 355 of the first plate 351 of the ball ramp device 350. The first plate 351 and second plate 352 are interconnected by balls 353 that ride in internal ramped slots.

The ball ramp device 350 is connected to thrust bearing 360, which is connected to the clutch pack 380. As noted above, first friction plates 381 are splined or otherwise mounted to the rotor shaft clutch hub 130, and second friction plates 382 are splined or otherwise mounted to the input shaft clutch hub 230.

As shown in FIGS. 4 and 5, the first input shaft 201 meshes with transfer gears 270. Transfer gears 270 drive small gears 280. Small gears 280 mesh with large gear 285, which ultimately drives the output shaft 290.

Another embodiment of a locking system 300 is illustrated in FIGS. 6-9. In the embodiment of FIGS. 6-9, components of the locking system 300 and the clutch hubs 130 and 230 are re-arranged. As a result, the thrust load created during actuation of the locking system 300 may be canceled out or eliminated.

Cross-referencing FIGS. 6-9, the vehicle includes the same features as described above, such as stator 105, rotor 110, rotor shaft 120, rotor shaft clutch hub 130, differential 150, input shafts 201 and 202, input shaft clutch hub 230, carrier 250, transfer gear 270, gears 280 and 285, and locking system 300—including actuator motor 310, geared shaft 315, actuator shaft 320, large gear 325, actuator gear 330, idler gear 340, ball ramp device 350, thrust bearing 360, and clutch pack 380. Further, the embodiment of FIGS. 6-9 further includes a fastener 140, such as a nut, and a second thrust bearing 360.

As shown, the structural arrangement of the clutch hubs 130 and 230 and the clutch pack 380 is modified. The rotor shaft clutch hub 130 is secured to the rotor shaft 120 in the axial direction by the fastener 140. As in the embodiment described above, the rotor shaft clutch hub 130 is splined to the rotor shaft 120 and the input shaft clutch hub 230 is splined to the first input shaft 201.

Unlike the embodiment described above, the clutch pack 380 is located between the ball ramp device 350 and the rotor 110. Thus, the first plate 351 is located on the rotor-side of the second plate 352, and the first plate 351 extends toward the rotor 110 when the first plate 351 is rotated by the idler gear 340.

The applied load from the first plate 351 is transmitted to the clutch pack 380 through a first thrust bearing 360. Further, the applied load is transmitted through the rotor shaft clutch hub 130 and through a second thrust bearing 360 to the carrier 250. The reaction load from the second plate 352 is transmitted to the carrier 250. Thus, the created loads cancel one another out in the carrier 250.

Operation of the embodiment of FIGS. 6-9 may be performed in the same manner as described above. Specifically, when the control system 90 determines that the differential 150 should be locked, the control system 90 may automatically lock the first input shaft 201 to the rotor shaft 120 through the locking system 300.

To lock the shafts 120 and 201, the control system 90 activates the actuator motor 310. When activated, the actuator motor 310 rotates the actuator shaft 320 in the first direction. As a result, the actuator gear 330 rotates in the first direction and causes the idler gear 340 to rotate. Rotation of the idler gear 340 causes rotation of the first plate 351 of the ball ramp device 350. Rotation of the first plate 351 causes linear movement of the first plate 351 away from the second plate 352, i.e., toward the rotor 110.

The thrust bearing 360 transmits the linear load from the first plate 351 of the ball ramp device 350 to the clutch pack 380 without impeding the rotation of the clutch pack 380 about the rotor axis 115. It is noted that the carrier 250 and the components of the locking system 300 upstream of the first thrust bearing 360, i.e., the actuator motor 310, shaft 320, gear 330, idler gear 340, and ball ramp device 350 do not rotate above the rotor axis 115.

When the linear force from the ball ramp device 350 through the thrust bearing 360 is applied to the clutch pack 380, the second friction plates 382 are driven in the linear direction away from the ball ramp mechanism 350 and into contact with the first friction plates 381.

As a result, the first input shaft 201 is locked in rotation with the rotor shaft 120 at a same rotational speed, and the second input shaft 202 is locked in rotation with the first input shaft 201 at the same rotational speed, as described above.

When the control system 90 determines that the differential 150 should be unlocked, the control system 90 may automatically unlock the first input shaft 201 from the rotor shaft 120.

Specifically, when the control system 90 determines that the differential 150 should be unlocked so that the first input shaft 201 and second input shaft 202 may rotate independently of one another, the control system 90 de-activates the actuator motor 310. When de-activated, the actuator motor 310 ceases application of the rotation force from the actuator motor 310 onto the actuator shaft 320 in the first direction. The force from the return device 390 to compel rotation of the actuator shaft 320 in the second direction then causes rotation of the actuator shaft 320 in the second direction. It is noted that the return device 390 is unpowered, so that the unpowered state of the locking system 300 is the unlocked configuration. Specifically, if the actuator motor 310 loses power, the return device 390 will rotate the actuator shaft 320 in the second direction and ensure that the locking system 300 is in the unlocked configuration.

Rotation of the actuator shaft 320 and actuator gear 330 in the second direction due to the force from the return device 390 causes the idler gear 340 to rotate back to its initial position. Likewise, rotation of the idler gear 340 causes the first plate 351 to rotate back to its initial position. As the first plate 351 returns to its initial position, the ball ramp device contracts. Specifically, the first plate 351 moves linearly back toward the second plate 352. As a result, the thrust bearing 360 and the second friction plates 382 are moved in the same linear direction. As a result, the second friction plates 382 disengage from the first friction plates 381. As a result, the clutch pack 380 is open and does not transmit rotational force.

When the clutch pack 380 is open, rotation of the first input shaft 201 is driven only by the differential 150. In other words, the first input shaft 201 is no longer directly connected to the rotor shaft 120.

Referring now to FIGS. 10-13, a third embodiment is illustrated. As shown in FIGS. 10-13, the vehicle includes the same features as described above, such as stator 105, rotor 110, rotor shaft 120, differential 150, input shafts 201 and 202, carrier 250, transfer gear 270, gears 280 and 285, and locking system 300—including actuator motor 310, geared shaft 315, large gear 325, actuator gear 330, ball ramp device 350, thrust bearing 360, and clutch pack 380. The rotor shaft clutch hub 130, input shaft clutch hub 230, actuator shaft 320, and idler gear 340 are not present in the third embodiment.

Figure 11:
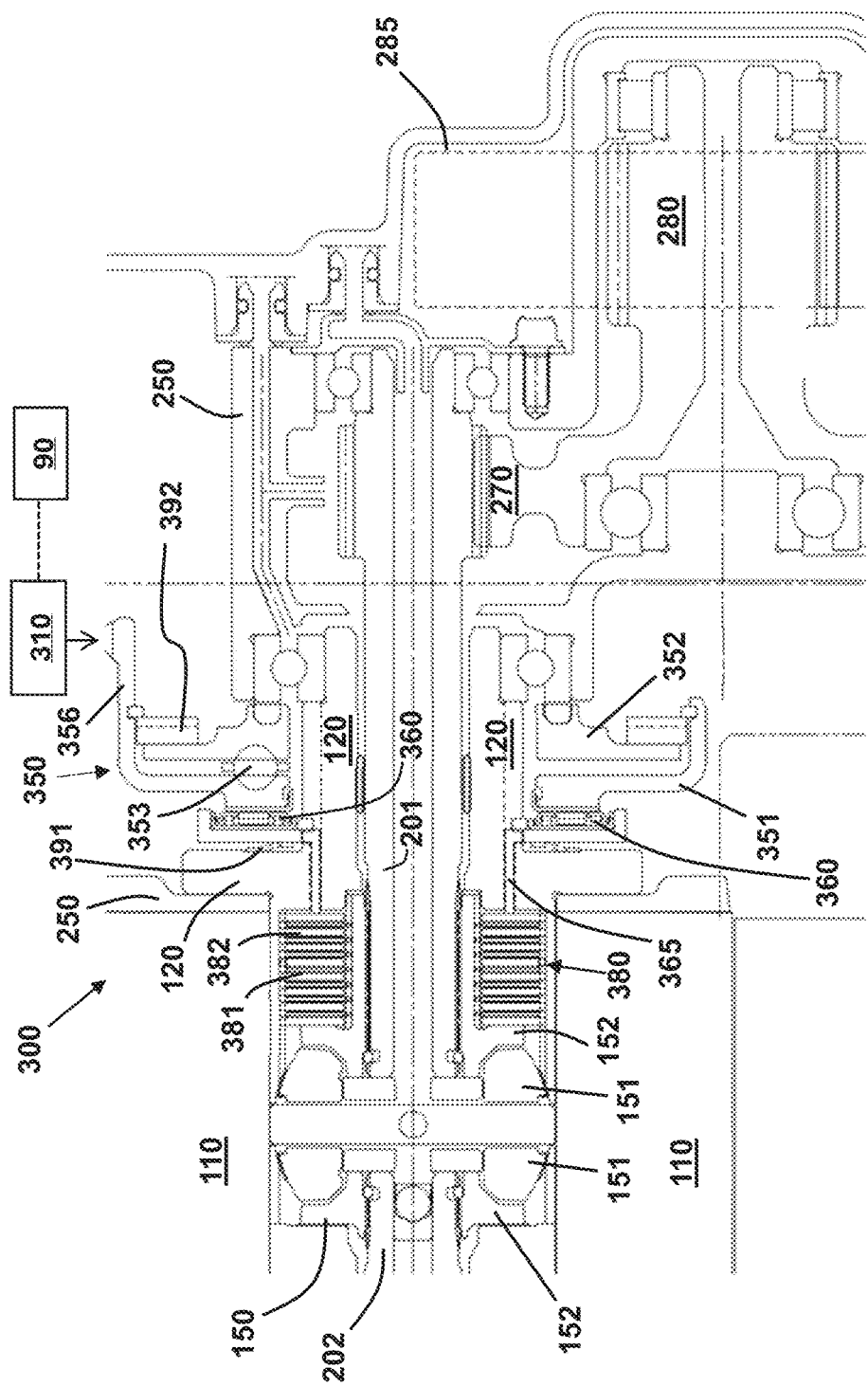
FIG. 11 is a focused portion of the cross-sectional schematic view of FIG. 10.
Figure 12:
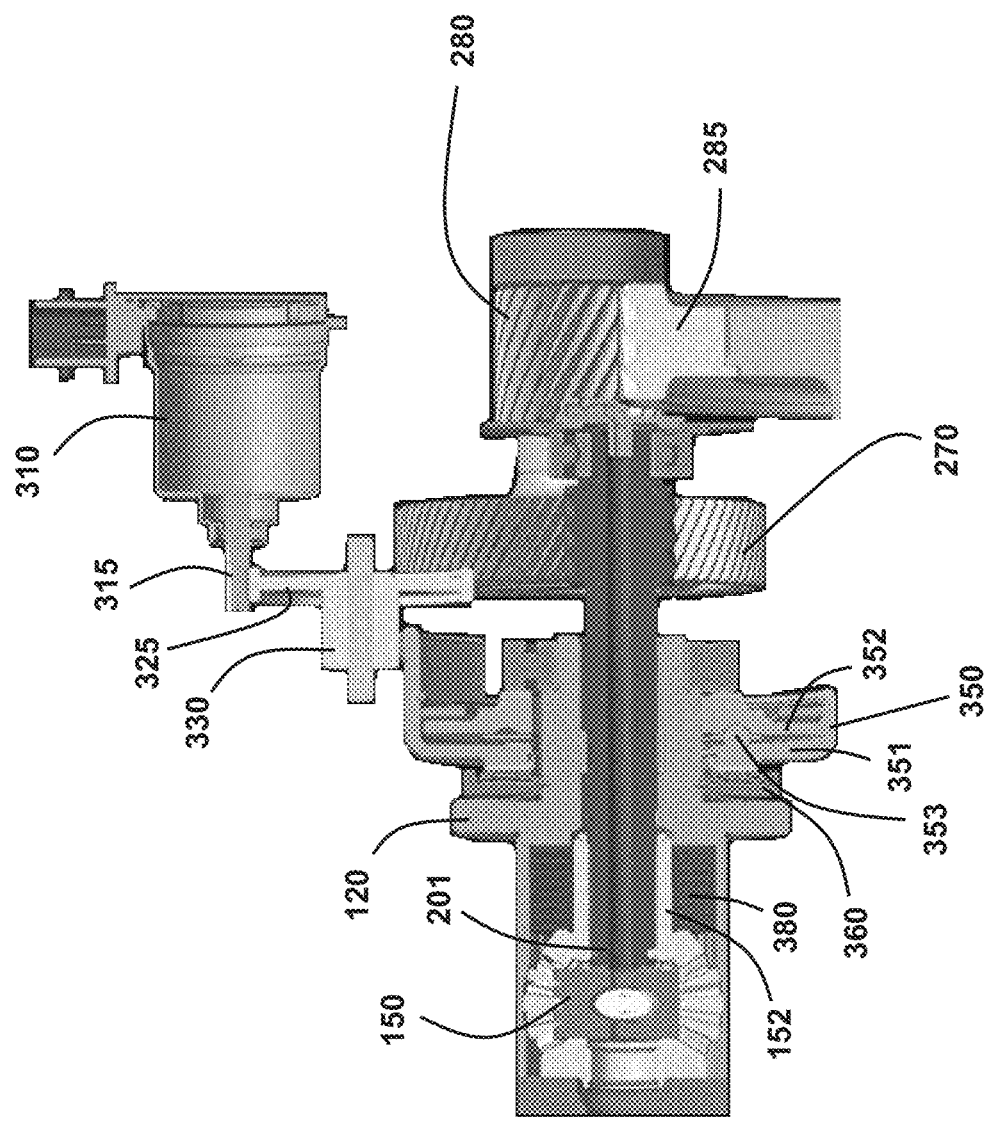
FIG. 12 is a perspective view taken along the rotor axis of the embodiment of FIG. 10, with certain components removed for clarity.
Figure 13:
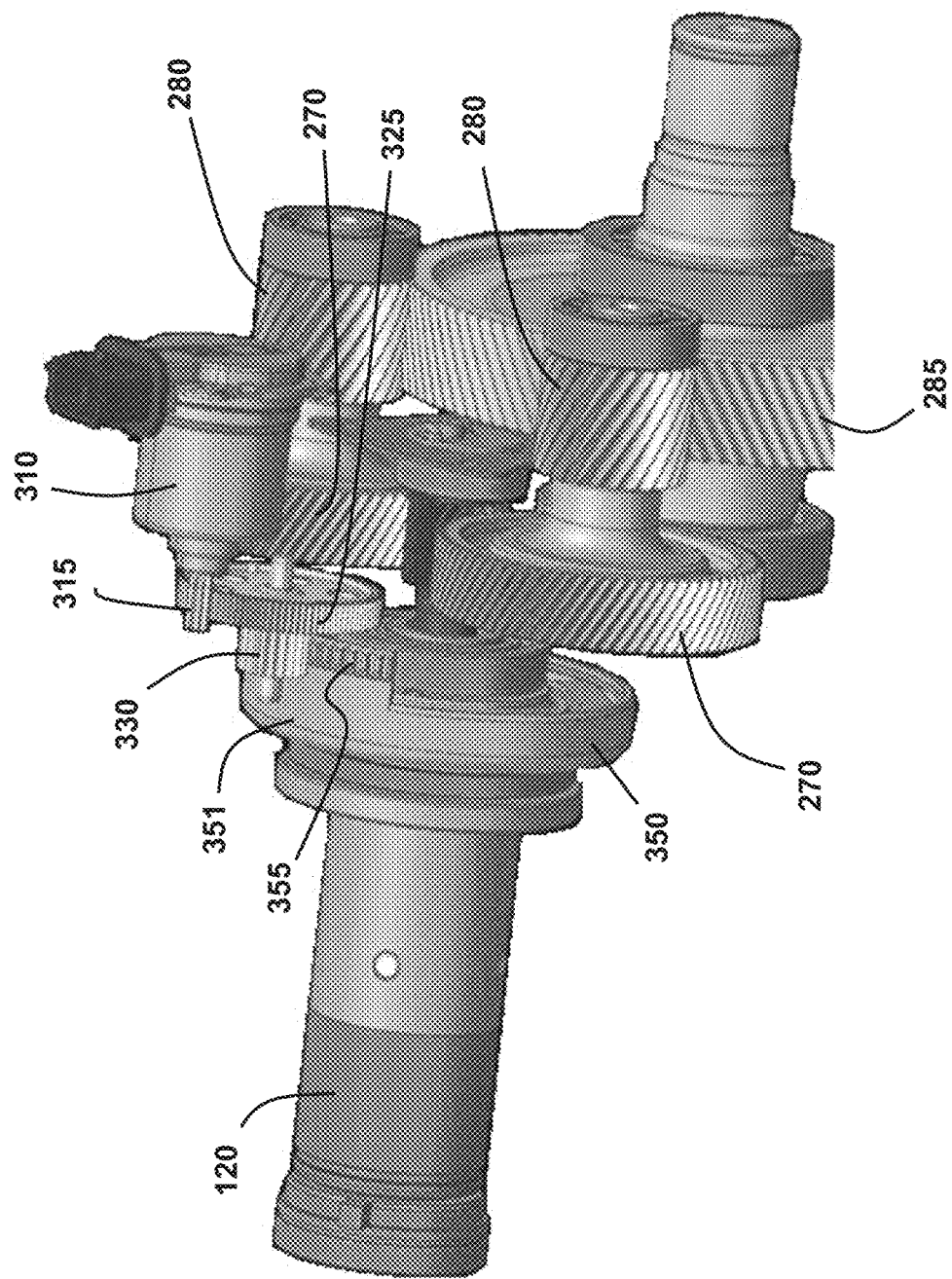
FIG. 13 is a perspective view of the embodiment of FIG. 10, with certain components removed for clarity.

In the third embodiment, the clutch pack 380 is internal to the rotor shaft 120 and is connected directly to the side differential gear 152. As shown, the structure of the differential side gear 152 differs from the above embodiments in order to provide such a connection. Further, in the third embodiment, an actuation plate 365 is added and interconnects the ball ramp device 350 directly to the clutch pack 380. Specifically, the actuation plate 365 extends through the rotor shaft 120 as shown in FIG. 11 (it is noted that the actuation plate 365 is not illustrated in the view of FIG. 12). As a result, neither clutch hub 130 nor clutch hub 230 is provided.

In the third embodiment, the first friction plates 381 are engaged to a differential side gear 152. For example, the first friction plates 381 may be splined to the differential side gear 152. Further, the second friction plates 382 are engaged to the rotor shaft 120. For example, the second friction plates 382 may be splined to the rotor shaft 120.

Also, in the third embodiment, the structure of the components of the locking system 300 are modified. For example, the actuator motor 310 is connected directly to the actuator gear 330, i.e., shaft 320 is not used. Also, the idler gear 340 is eliminated, as the actuator gear 330 engages the toothed outer perimeter 355 of the first plate 351 of the ball ramp device 350 directly. To enable such a connection, the first plate 351 includes an extension 356 on which the toothed outer perimeter 355 is located.

In the third embodiment, two return devices 390, including return device 391 and return device 392 are provided to return the locking system 300 to the unlocked configuration when the actuator motor 310 does not apply an actuation force to hold the locking system 300 in the locked configuration. The first return device 391 may be a return spring that biases the actuation plate 365 in a linear direction away from the rotor 110. The second return device 392 may be a wave return spring that biases the first plate 351 toward the closed configuration of the ball ramp device 350. Specifically, the wave return spring may engage a projection 359 of the first plate 351.

In the embodiment of FIGS. 10-13, when the control system 90 determines that the differential 150 should be locked, the control system 90 may automatically lock the rotor shaft 120 to a side differential gear 152 through the locking system 300. Because the first input shaft 201 is directly connected to the side differential gear 152, such as through a splined connection, the rotor shaft 120 is locked to the first input shaft 201 through the differential side gear 152.

Specifically, the control system 90 activates the actuator motor 310. When activated, the actuator motor 310 rotates the actuator gear 330 in the first direction. Due to the engagement of the actuator gear 330 and the toothed outer perimeter 355 of the first plate 351 of the ball ramp device 350, rotation of the actuator gear 330 causes rotation of the first plate 351 of the ball ramp device 350. Rotation of the first plate 351 causes linear movement of the first plate 351 away from the second plate 352, i.e., toward the rotor 110.

The thrust bearing 360 transmits the linear load from the first plate 351 of the ball ramp device 350 to the actuation plate 365 without impeding the rotation of the actuation plate 365 about the rotor axis 115. It is noted that the carrier 250 and the components of the locking system 300 upstream of the thrust bearing 360, i.e., the actuator motor 310, gear 330, and ball ramp device 350 do not rotate above the rotor axis 115.

The linear force from the ball ramp device 350 through the thrust bearing 360 and through the actuation plate 365 is applied to the clutch pack 380. As a result, the second friction plates 382 are driven in the linear direction away from the ball ramp mechanism 350 and into contact with the first friction plates 381.

As a result, the rotor shaft 120 is locked in rotation with the differential side gear 152 and the first input shaft 201 at a same rotational speed, and the second input shaft 202 is locked in rotation with the first input shaft 201 at the same rotational speed.

When the control system 90 determines that the differential 150 should be unlocked, the control system 90 may automatically unlock the rotor shaft 120 from the differential side gear 152.

Specifically, when the control system 90 determines that the differential 150 should be unlocked so that the first input shaft 201 and second input shaft 202 may rotate independently of one another, the control system 90 de-activates the actuator motor 310. When de-activated, the actuator motor 310 ceases application of the rotation force from the actuator motor 310 onto the actuator gear 330 in the first direction. The force from the return devices 391 and 392 compel a linear movement of the first plate 351 and closure of the ball ramp device 350. It is noted that the return devices 391 and 392 are unpowered, so that the unpowered state of the locking system 300 is the unlocked configuration. Specifically, if the actuator motor 310 loses power, the return devices 391 and 392 will push the actuation plate 365 in a linear direction away from the rotor 110, and will push the first plate 351 (through projection 359) in a linear direction away from the rotor 110. As a result, the return devices 391 and 392 cause the ball ramp device 350 to close to ensure that the locking system 300 is in the unlocked configuration.

When the actuation plate 365 moves linearly away from the rotor 110, the second friction plates 382 disengage from the first friction plates 381. As a result, the clutch pack 380 is open and does not transmit rotational force.

When the clutch pack 380 is open, rotation of the first input shaft 201 is driven only by the differential 150. In other words, the first input shaft 201 is no longer directly connected to the rotor shaft 120.

While certain components and features are described above in relation to an illustrated embodiment, it is noted that any component or feature may be included in any embodiment.

Certain embodiments herein provide for electric drive unit upstream differential torque control, such as through an automatic locking differential. The locking mechanism or system is integrated "upstream", i.e., up the gear train, from the wheel output. At the upstream location, the speed difference between sides may be very large. For example, for a wheel speed difference of 10 rpm in a gear train having a 17:1 gear ratio, the speed difference between the first and second input shafts may be 170 rpm. The embodiments described herein are designed to tolerate such great speed differences.

In certain embodiments herein, a clutch mechanism is used to act as a synchronizer and to hold the torque, i.e., equalize the speeds of the two input shafts.

In certain embodiments herein, the differential is located at the rotor, rotates about the rotor axis, and rotates at the high speed of the rotor. Embodiments herein provide for locking the differential by adding the clutch mechanism in the locking system. As a result, speed differences between the two input shafts are prevented when the locking system is engaged.

In certain embodiments herein, when the locking mechanism is not actuated, the first input shaft is not locked to the rotor shaft, and the first input shaft and second input shaft may rotate at different speeds. When the locking mechanism is actuated, the first input shaft is locked to the rotor shaft. Thus, the first input shaft must rotate at the speed of the rotor shaft. Because the first input shaft is not free to rotate at a different speed, the second input shaft also must rotate at the speed of the rotor shaft due to engagement of the first input shaft and the second input shaft to the gears of the differential.

Certain embodiments herein combine a clutch pack, a ball ramp mechanism, and a bearing and shaft arrangement, to provide for locking an upstream differential located inside an electric motor rotor in an electric drive unit.

Certain embodiments herein include an automatic locking differential kinematically located within a motor rotor.

Certain embodiments herein include an upstream differential torque transfer plate clutch configured to regulate the downstream torque to protect the downstream gear sets.

Certain embodiments herein include an upstream differential torque transfer plate clutch configured to passively release and open on removal of electric current to an actuator.

Certain embodiments herein include an upstream differential torque transfer plate clutch configured to provide external service to the actuator motor.

Certain embodiments herein include a ball ramp actuated plate clutch mechanism for an electric drive unit utilizing an upstream differential. In certain embodiments herein, the differential is a bevel gear design packaged within an electric motor rotor.

In certain embodiments herein, the clutch device is located laterally adjacent to the rotor.

In certain embodiments herein, the ball ramp device is actuated by a motor which is located on an axis parallel to axis of the rotor.

In certain embodiments herein, forces exerted on the clutch pack are canceled within the electric motor rotor. In certain embodiments herein, forces exerted on the plate clutch mechanism are canceled within the gear carrier.

In certain embodiments herein, the clutch device is defaulted to unapplied state via a torsion return spring on actuator shaft. In certain embodiments herein, the actuator shaft is driven by an externally mounted motor.

In certain embodiments herein, the plate clutch mechanism is located within the rotor. In such embodiments, the plate clutch mechanism may be defaulted to unapplied state via a wave plate return spring on actuator shaft.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An electric vehicle comprising:
an electric motor including a stator and a rotor, wherein the rotor is configured to rotate about a rotor axis;
a rotor shaft connected to the rotor for rotation about the rotor axis;
a differential located within the rotor shaft;
a first input shaft connected to first side of the differential;
a second input shaft connected to second side of the differential;
a locking system comprising a clutch plate mechanism configured to selectively lock rotation of the first input shaft to rotation of the rotor shaft, wherein the clutch plate mechanism is located between a first thrust bearing and a second thrust bearing;
a control system configured to determine when to lock rotation of the first input shaft to rotation of the rotor shaft;
an actuation system configured to operate the locking system to lock rotation of the first input shaft to rotation of the rotor shaft; and
a carrier, wherein:
the rotor shaft is rotatably mounted to the carrier to rotate about the rotor axis independent of the carrier;
the actuation system is mounted to the carrier;
a first end of the clutch plate mechanism is mounted to the actuation system; and
a second end of the clutch plate mechanism is mounted to the carrier, such that forces exerted on the clutch plate mechanism by the actuation system are canceled within the carrier.

2. The vehicle of claim 1, further comprising:
a passive return device configured to disconnect rotation of the first input shaft from rotation of the rotor shaft.

3. The vehicle of claim 1, further comprising:
a rotor shaft clutch hub in splined connection with the rotor shaft; and
an input shaft clutch hub in splined connection with the first input shaft;

wherein the locking system comprises a first plate mechanically coupled to the rotor shaft clutch hub and a second plate mechanically coupled to the input shaft clutch hub; and the first plate and second plate are pressed together to lock rotation of the first input shaft to rotation of the rotor shaft.

4. The vehicle of claim 1, wherein the second thrust bearing is located between the carrier and the clutch plate mechanism.

5. The vehicle of claim 1, wherein the first thrust bearing is located between the actuation system and the clutch plate mechanism.

6. The vehicle of claim 1, further comprising:
a rotor shaft clutch hub in splined connection with the rotor shaft; and
an input shaft clutch hub in splined connection with the first input shaft;
wherein the clutch plate mechanism is interconnected between the rotor shaft clutch hub and the input shaft clutch hub.

7. The vehicle of claim 6, wherein the second thrust bearing is located between the carrier and the rotor shaft clutch hub.

8. The vehicle of claim 6, wherein the rotor shaft clutch hub is located between the second thrust bearing and the input shaft clutch hub.

9. A locking differential system for a motor vehicle, comprising:
a rotor shaft operatively connected to an electric motor, wherein the rotor shaft is configured to rotate about a rotor axis;
differential gears housed within the rotor shaft and configured to rotate about the rotor axis, wherein the differential gears include a side differential gear;
a first input shaft operatively connected to the differential gears and rotatable about the rotor axis, wherein the first input shaft is configured to transmit power from the rotor shaft to a first output;
a second input shaft operatively connected to the differential gears and rotatable about the rotor axis, wherein the second input shaft is configured to transmit power from the rotor shaft to a second output; and
a lock configured to selectively lock the first input shaft to the rotor shaft, wherein the lock comprises an actuator and comprises a clutch pack internal to the rotor shaft and connected directly to the side differential gear, wherein the clutch pack includes a first plate and a second plate, wherein the actuator is configured to selectively press the first plate and the second plate together, wherein the actuator comprises an actuator gear selectively driven by an actuator shaft, wherein the actuator comprises a ball ramp having a periphery operatively connected to the actuator gear, and wherein the ball ramp is configured to translate a rotary motion from the actuator gear to a lateral motion by expanding to press the first plate and the second plate together.

10. The locking differential system of claim 9, wherein the lock further comprises an actuation plate interconnecting the ball ramp device directly to the clutch pack, wherein the actuation plate extends through the rotor shaft.

11. The locking differential system of claim 9, wherein the wherein the actuator further comprises a return device configured to cause the ball ramp to contract to disconnect the first plate and the second plate.

12. The locking differential system of claim 9, wherein the first plate is mechanically coupled to the side differential gear and the second plate is mechanically coupled to the rotor shaft, wherein the side differential gear is coupled to the first input shaft, and wherein the first plate and second plate are pressed together when the clutch device is closed.

13. A locking differential system for a motor vehicle, comprising:
a rotor shaft operatively connected to an electric motor, wherein the rotor shaft is configured to rotate about a rotor axis;
differential gears housed within the rotor shaft and configured to rotate about the rotor axis, wherein the differential gears include a side differential gear;
a first input shaft operatively connected to the differential gears and rotatable about the rotor axis, wherein the first input shaft is configured to transmit power from the rotor shaft to a first output;
a second input shaft operatively connected to the differential gears and rotatable about the rotor axis, wherein the second input shaft is configured to transmit power from the rotor shaft to a second output; and
a lock configured to selectively lock the first input shaft to the rotor shaft, wherein the lock comprises:
a clutch pack internal to the rotor shaft and connected directly to the side differential gear;
a ball ramp device configured to selectively close and selectively open the clutch pack; and
an actuation plate interconnecting the ball ramp device directly to the clutch pack, wherein the actuation plate extends through the rotor shaft.

14. The locking differential system of claim 13, wherein the actuator further comprises a return device configured to cause the ball ramp to contract to disconnect the first plate and the second plate.

* * * * *